(12) United States Patent
Wang et al.

(10) Patent No.: US 9,521,393 B2
(45) Date of Patent: Dec. 13, 2016

(54) NON-NESTED SEI MESSAGES IN VIDEO CODING

(71) Applicant: QUALCOMM Incorporated, San Diego, CA (US)

(72) Inventors: Ye-Kui Wang, San Diego, CA (US); Ying Chen, San Diego, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 564 days.

(21) Appl. No.: 14/036,873

(22) Filed: Sep. 25, 2013

(65) Prior Publication Data

US 2014/0192149 A1    Jul. 10, 2014

Related U.S. Application Data

(60) Provisional application No. 61/749,786, filed on Jan. 7, 2013.

(51) Int. Cl.
*H04N 19/70*    (2014.01)
*H04N 13/00*    (2006.01)
(Continued)

(52) U.S. Cl.
CPC .......... *H04N 13/0048* (2013.01); *H04N 19/30* (2014.11); *H04N 19/46* (2014.11); *H04N 19/70* (2014.11)

(58) Field of Classification Search
CPC ... H04N 19/70; H04N 19/187; H04N 13/0048
See application file for complete search history.

(56) References Cited

U.S. PATENT DOCUMENTS 8,325,814 B2    12/2012    Koo
2008/0152001 A1    6/2008    Yousef
(Continued)

FOREIGN PATENT DOCUMENTS

TW    I353181 B    11/2011
TW    I353792 B    12/2011
TW    I355204 B    12/2011

OTHER PUBLICATIONS

International Preliminary Report on Patentability from International Application No. PCT/US2013/077828, dated May 11, 2015, 8 pp.
(Continued)

*Primary Examiner* — Obafemi Sosanya
(74) *Attorney, Agent, or Firm* — Shumaker & Sieffert, P.A.

(57) ABSTRACT

A device obtains, from a bitstream that includes an encoded representation of the video data, a non-nested Supplemental Enhancement Information (SEI) message that is not nested within another SEI message in the bitstream. Furthermore, the device determines a layer of the bitstream to which the non-nested SEI message is applicable. The non-nested SEI message is applicable to layers for which video coding layer (VCL) network abstraction layer (NAL) units of the bitstream have layer identifiers equal to a layer identifier of a SEI NAL unit that encapsulates the non-nested SEI message. A temporal identifier of the SEI NAL unit is equal to a temporal identifier of an access unit containing the SEI NAL unit. Furthermore, the device processes, based in part on one or more syntax elements in the non-nested SEI message, video data of the layer of the bitstream to which the non-nested SEI message is applicable.

19 Claims, 5 Drawing Sheets

(51) Int. Cl.
*H04N 19/46* (2014.01)
*H04N 19/30* (2014.01)

(56) References Cited

U.S. PATENT DOCUMENTS

| | | |
|---|---|---|
| 2008/0175325 A1 | 7/2008 | Hannuksela et al. |
| 2010/0091837 A1 | 4/2010 | Zhu et al. |
| 2010/0091882 A1 | 4/2010 | Luo et al. |
| 2011/0038424 A1 | 2/2011 | Luo et al. |
| 2013/0060956 A1 | 3/2013 | Nagaraj et al. |
| 2014/0003489 A1* | 1/2014 | Hannuksela ........... H04N 19/70 375/240.02 |

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "Proposed editorial improvements for High Efficiency Video Coding (HEVC) text specification draft 9 (SoDIS)," Joint Collaborative Team on Video Coding (JCT-VC) of ITUT SG 16 WP 3 and ISO/IEC JTC 1/SC 29/WG 11, JCTVC-L0030, Jan. 14-23, 2013, 320 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Choi et al., "AHG9: NAL unit header with layer ID partitioning," JCT-VC Meeting; MPEG Meeting; Shanghai; (Joint Collaborative Team on Video Coding of ISO/IEC JTC1/SC29/WG11 and ITU-T SG.16 ); URL: http://wftp3.itu.int/av-arch/jctvc-site/,, No. JCTVC-K0177, Oct. 10-19, 2012, 8 pp.

International Search Report and Written Opinion—PCT/US2013/077828 —ISA/EPO—Mar. 24, 2014, 13 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Sjoberg et al., "High-Level Syntax for Bitstream Extraction," JCT-VC Meeting; MPEG Meeting; Geneva; (Joint Collaborative Team on Video Coding of ISO/IEC JTC1/SC29/WG11 and ITU-T SG.16); URL: http://wftp3.itu.int/av-arch/jctvc-site/ No. JCTVC-G607, Nov. 21-30, 2011, 14 pp.
Wang et al., "AHG9: HEVC SEI messages cleanups," JCT-VC Meeting; MPEG Meeting; Geneva; (Joint Collaborative Team on Video Coding of ISO/IEC JTC1/SC29/WG11 and ITU-T SG.16 ); URL: http://wtfp3.itu.int/av-arch/jctvc-site/, No. JCTVC-L0045v1, Jan. 14-23, 2013, 5 pp.
Wang, "AHG9: On HRD and related general issues," JCT-VC Meeting; MPEG Meeting; Shanghai; (Joint Collaborative Team on Video Coding of ISO/IEC JTC1/SC29/WG11 and ITU-T SG.16 ); URL: http://wftp3.itu.int/av-arch/jctvc-site/ No. JCTVC-K0126, Oct. 10-19, 2012, 7 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.
Second Written Opinion of International Application No. PCT/US2013/077828, mailed Feb. 5, 2015, 7 pp.
Response to Written Opinion mailed Mar. 24, 2014, from International Application No. PCT/US2013/077828, dated Jun. 24, 2014, 6 pp.
Response to Second Written Opinion mailed Feb. 5, 2015, from International Application No. PCT/US2013/077828, dated Apr. 1, 2014, 29 pp.

* cited by examiner

NON-NESTED SEI MESSAGES IN VIDEO CODING

This application claims the benefit of U.S. Provisional Patent Application No. 61/749,786, filed Jan. 7, 2013, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views. e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure describes the use of non-nested Supplemental Enhancement Information (SEI) in video coding. Non-nested SEI messages are SEI messages that are not contained within scalable nesting SEI messages. Specifically, this disclosure describes a video processor that obtains, from a bitstream that includes an encoded representation of video data, a non-nested SEI message. Furthermore, the video processor determines a layer of the bitstream to which the non-nested SEI message is applicable. The non-nested SEI message is applicable to layers for which video coding layer (VCL) network abstraction layer (NAL) units of the bitstream have layer identifiers equal to a layer identifier of a SEI NAL unit that encapsulates the non-nested SEI message. A temporal identifier of the SEI NAL unit is equal to a temporal identifier of an access unit containing the SEI NAL unit. The video processor may process, based in part on one or more syntax elements in the non-nested SEI message, video data of the layer of the bitstream to which the non-nested SEI message is applicable.

In one example, this disclosure describes a method of processing video data, the method comprising: obtaining, from a bitstream that includes an encoded representation of the video data, a non-nested SEI message that is not nested within another SEI message in the bitstream; determining a layer of the bitstream to which the non-nested SEI message is applicable, wherein the non-nested SEI message is applicable to layers for which VCL NAL units of the bitstream have layer identifiers equal to a layer identifier of a SEI NAL unit that encapsulates the non-nested SEI message, and wherein a temporal identifier of the SEI NAL unit is equal to a temporal identifier of an access unit containing the SEI NAL unit; and processing, based in part on one or more syntax elements in the non-nested SEI message, video data of the layer of the bitstream to which the non-nested SEI message is applicable.

In another example, this disclosure describes a video processing device comprising one or more processors configured to: obtain, from a bitstream that includes an encoded representation of video data, a non-nested SEI message that is not nested within another SEI message in the bitstream; determine a layer of the bitstream to which the non-nested SEI message is applicable, wherein the non-nested SEI message is applicable to layers for which VCL NAL units of the bitstream have layer identifiers equal to a layer identifier of a SEI NAL unit that encapsulates the non-nested SEI message, and wherein a temporal identifier of the SEI NAL unit is equal to a temporal identifier of an access unit containing the SEI NAL unit; and process, based in part on one or more syntax elements in the non-nested SEI message, video data of the layer of the bitstream to which the non-nested SEI message is applicable.

In another example, this disclosure describes a video processing device comprising: means for obtaining, from a bitstream that includes an encoded representation of video data, a non-nested SEI message that is not nested within another SEI message in the bitstream; means for determining a layer of the bitstream to which the non-nested SEI message is applicable, wherein the non-nested SEI message is applicable to layers for which VCL NAL units of the bitstream have layer identifiers equal to a layer identifier of a SEI NAL unit that encapsulates the non-nested SEI message, and wherein a temporal identifier of the SEI NAL unit is equal to a temporal identifier of an access unit containing the SEI NAL unit; and means for processing, based in part on one or more syntax elements in the non-nested SEI message, video data of the layer of the bitstream to which the non-nested SEI message is applicable.

In another example, this disclosure describes a computer-readable storage medium having instructions stored thereon that, when executed, configure a video processing device to: obtain, from a bitstream that includes an encoded representation of video data, a non-nested SEI message that is not nested within another SEI message in the bitstream; determine a layer of the bitstream to which the non-nested SEI message is applicable, wherein the non-nested SEI message is applicable to layers for which VCL NAL units of the bitstream have layer identifiers equal to a layer identifier of a SEI NAL unit that encapsulates the non-nested SEI message, and wherein a temporal identifier of the SEI NAL unit is equal to a temporal identifier of an access unit containing the SEI NAL unit; and process, based in part on one or more syntax elements in the non-nested SEI message, video data of the layer of the bitstream to which the non-nested SEI message is applicable.

The details of one or more examples of the disclosure are set forth in the accompanying drawings and the description below. Other features, objects, and advantages will be apparent from the description, drawings, and claims.

DETAILED DESCRIPTION

Figure 1:
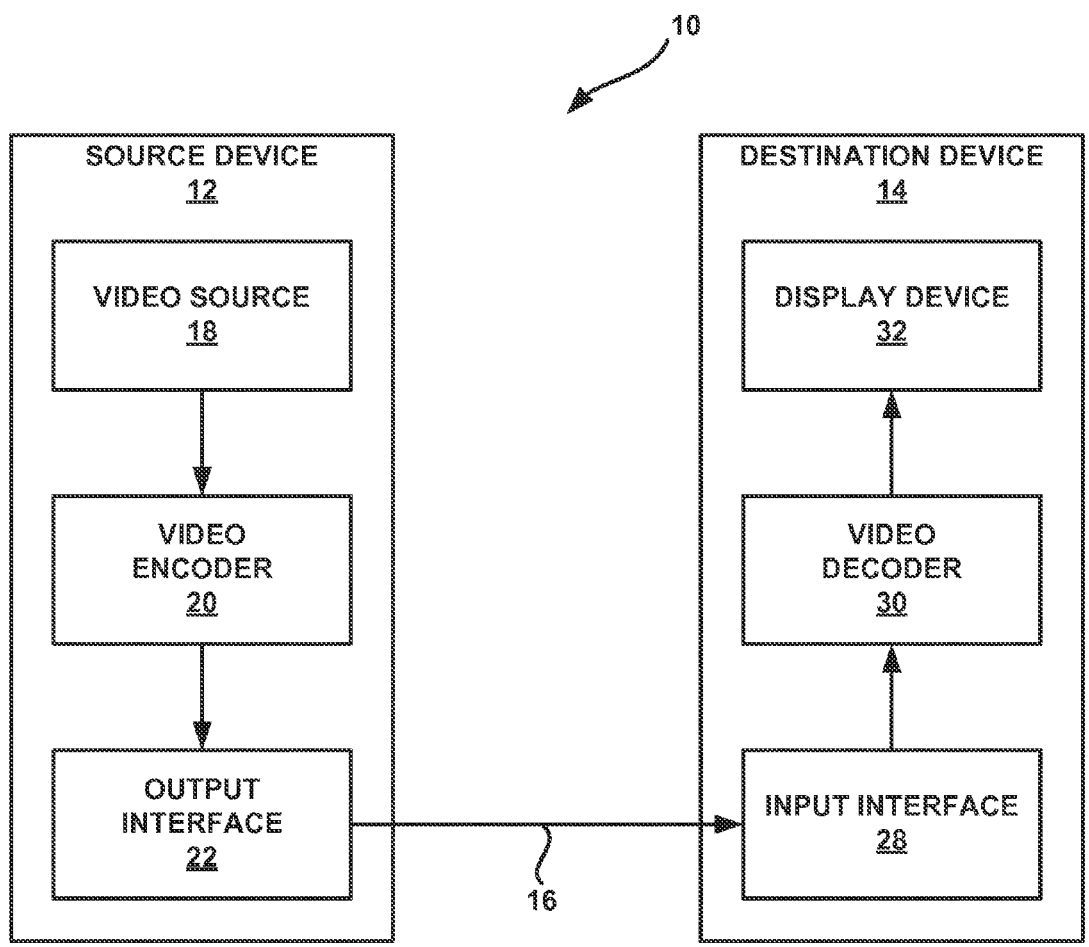
FIG. 1 is a block diagram illustrating an example video coding system that may utilize the techniques described in this disclosure.

A video encoder may generate a bitstream that includes an encoded representation of video data. The bitstream may comprise a series of network abstraction layer (NAL) units. A NAL unit may be a syntax structure containing an indication of the type of data in the NAL unit and bytes containing that data in the form of a raw byte sequence payload (RBSP) interspersed as necessary with emulation prevention bits. The NAL units may include video coding layer (VCL) NAL units and non-VCL NAL units. The VCL NAL units may include coded slices of pictures. A non-VCL NAL unit may encapsulate a video parameter set (VPS), a sequence parameter set (SPS), a picture parameter set (PPS), one or more supplemental enhancement information (SEI) messages, or other types of data.

Furthermore, NAL units of the bitstream may be associated with different layers of the bitstream. In scalable video coding (SVC), the layers other than a base layer may be referred to as "enhancement layers" and may include data that improve the quality of playback of the video data. In multi-view coding and 3-dimensional video (3DV) coding, the layers may include data associated with different views. Each layer of the bitstream is associated with a different layer identifier. In addition, NAL units may include temporal identifiers. An operation point is a subset of the temporal layers of the bitstream. Each operation point of a bitstream has a set of layer identifiers (i.e., a set of nuh_reserved_zero_6 bits values) and a temporal identifier. If a NAL unit specifies a layer identifier in the set of layer identifiers for an operation point and the temporal identifier of the NAL unit is less than or equal to the temporal identifier of the operation point, the NAL unit is associated with the operation point.

As indicated above, the bitstream may include NAL units that encapsulate SEI messages. A NAL unit that encapsulates one or more SEI messages is referred to herein as a SEI NAL unit. One type of SEI message is a scalable nesting SEI message. A scalable nesting SEI message is an SEI message that contains one or more additional SEI messages. An SEI message that is not contained in a scalable nesting SEI message is referred to herein as a non-nested SEI message.

Certain types of SEI messages contain information that is only applicable to particular operation points. For example, buffering period SEI messages, picture timing SEI messages, and decoding unit SEI messages are only applicable to particular operation points. Thus, in order to use the information in such SEI messages, a video processor may determine which operation points are applicable to the SEI messages. Other types of SEI messages are only applicable to particular layers. Thus, in order to use the information in such SEI messages, the video processor may determine which layers are applicable to the SEI messages.

Previous video coding specifications have not provided clear indications regarding the operation points or layers to which particular non-nested SEI messages apply. As a result, a video decoder may be unable to use such non-nested SEI messages. Thus, the inclusion of such non-nested SEI messages in the bitstream may be a waste of bits.

In accordance with one or more techniques of this disclosure, a video processor may determine whether a non-nested SEI message is a buffering picture SEI message, a picture timing SEI message, or a decoding unit SEI message. If the non-nested SEI message is one of these three types of SEI message, the video processor may determine an operation point applicable to the non-nested SEI message. In one example, a highest temporal identifier of all NAL units of the operation point applicable to the non-nested SEI message is equal to a temporal identifier of a SEI NAL unit that encapsulates the non-nested SEI message. Furthermore, in this example, a set of layer identifiers of all the NAL units of the operation point applicable to the non-nested SEI message contains all integer values in the range of 0 to the layer identifier of the SEI NAL unit that encapsulates the non-nested SEI message.

Furthermore, in accordance with one or more techniques of this disclosure, if the non-nested SEI message is a type of SEI message other than a buffering picture SEI message, a picture timing SEI message, or a decoding unit SEI message, the video coder may determine a layer of the bitstream to which the non-nested SEI message is applicable. Specifically, the non-nested SEI message may apply only to layers for which VCL NAL units of the bitstream have layer identifiers equal to a layer identifier of a SEI NAL unit that encapsulates the non-nested SEI message. In this way, the applicable operation points or layers for types of non-nested SEI message are clearly specified.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any bitstream conforming to the MVC-based 3DV extension of H.264/AVC always contains a sub-bitstream that is compliant to the MVC extension of H.264/AVC. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, and ITU-T H.264, ISO/IEC Visual.

In other examples, video encoder 20 and video decoder 30 may operate according to the High Efficiency Video Coding (HEVC) developed by the Joint Collaboration Team on Video Coding (JCT-VC) of ITU-T Video Coding Experts Group (VCEG) and ISO/IEC Motion Picture Experts Group (MPEG). A draft of the upcoming HEVC standard, referred to as "HEVC Working Draft 8" is described in Bross et al., "High Efficiency Video Coding (HEVC) text specification draft 8," Joint Collaborative Team on Video Coding (JCT-VC) of ITU-T SG 16 WP3 and ISO/IEC JTC1SC29/WG11, 10$^{th}$ Meeting, Stockholm, Sweden, July 2012. Another draft of the upcoming HEVC standard, referred to as "HEVC Working Draft 9" is described in Bross et al., "High Efficiency Video Coding (HEVC) text specification draft 9," Joint Collaborative Team on Video Coding (JCT-VC) of ITU-T SG 16 WP3 and ISO/IEC JTC1/SC29/WG11, 11$^{th}$ Meeting, Shanghai, China, October 2012. Furthermore, there are ongoing efforts to produce scalable video coding, multi-view coding, and 3DV extensions for HEVC. The scalable video coding extension of HEVC may be referred to as SHEVC. The 3DV extension of HEVC may be referred to as HEVC-based 3DV or HEVC-3DV.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In multi-view coding, there may be multiple views of the same scene from different viewpoints. The term "access unit" is used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier. Example types of view components include texture view components and depth view components.

Multi-view coding supports inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

Video coding standards specify video buffering models. In H.264/AVC and HEVC, a buffering model is referred to as a "hypothetical reference decoder" or "HRD." In HEVC Working Draft 8, the HRD is described in Annex C.

The HRD describes how data is to be buffered for decoding and how decoded data is buffered for output. For instance, the HRD describes the operation of a coded picture buffer ("CPB"), a decoded picture buffer ("DPB"), and a video decoding process. The CPB is a first-in first-out buffer containing access units in a decoding order specified by the HRD. The DPB is a buffer holding decoded pictures for reference, output reordering, or output delay specified by the HRD. The behaviors of the CPB and DPB may be mathematically specified. The HRD may directly impose constraints on timing, buffer sizes, and bit rates. Furthermore, the HRD may indirectly impose constraints on various bitstream characteristics and statistics.

In H.264/AVC and HEVC, bitstream conformance and decoder conformance are specified as parts of the HRD specification. In other words, the HRD model specifies tests to determine whether a bitstream conforms to a video coding specification and tests to determine whether a decoder conforms to the video coding specification. Though the HRD is named as some kind of decoder, video encoders typically use the HRD to guarantee bitstream conformance, while video decoders typically do not need the HRD.

H.264/AVC and HEVC both specify two types of bitstream or HRD conformance, namely Type I and Type II. A Type I bitstream is a NAL unit stream containing only the VCL NAL units and filler data NAL unit for all access units in the bitstream. A Type II bitstream is a NAL unit stream that contains, in addition to the VCL NAL units and filler data NAL units for all access units in the bitstream, at least one of the following: additional non-VCL NAL units other than filler data NAL units; and all leading_zero_8 bits, zero_byte, start_coded_prefix_one_3 bytes, and trailing_zero_8 bits syntax elements that form a byte stream from the NAL unit stream.

When a device performs a bitstream conformance test that determines whether a bitstream conforms to a video coding standard, the device may select an operation point of the bitstream. The device may then determine a set of HRD parameters applicable to the selected operation point. The device may use the set of HRD parameters applicable to the selected operation point to configure the behavior of the HRD. More particularly, the device may use the applicable set of HRD parameters to configure the behaviors of particular components of the HRD, such as a hypothetical stream scheduler (HSS), the CPB, a decoding process, the DPB, and so on. Subsequently, the HSS may inject coded video data of the bitstream into the CPB of the HRD according to a particular schedule.

Furthermore, as part of performing the bitstream conformance test, the device may invoke a decoding process that decodes the coded video data in the CPB. The decoding process may output decoded pictures to the DPB. As the device moves data through the HRD, the device may determine whether a particular set of constraints remains satisfied. For example, the device may determine whether an overflow condition or an underflow condition occurs in the CPB or DPB while the HRD is decoding the operation point representation of the selected operation point. The device may select and process each operation point of the bitstream in this manner. If no operation point of the bitstream causes the constraints to be violated, the device may determine that the bitstream conforms to the video coding standard.

Both H.264/AVC and HEVC specify two types of decoder conformance, namely output timing decoder conformance and output order decoder conformance. A decoder claiming conformance to a specific profile, tier and level is able to successfully decode all bitstreams that conform to the bitstream conformance requirements of a video coding standard, such as HEVC. In this disclosure, a "profile" may refer to a subset of the bitstream syntax. "Tiers" and "levels" may be specified within each profile. A level of a tier may be a specified set of constraints imposed on values of the syntax elements in the bitstream. These constraints may be simple limits on values. Alternatively, the constraints may take the form of constraints on arithmetic combinations of values (e.g., picture width multiplied by picture height multiplied by number of pictures decoded per second). Typically, a level specified for a lower tier is more constrained than a level specified for a higher tier.

When a device performs a decoder conformance test to determine whether a decoder under test (DUT) conforms to a video coding specification, the device may provide, to both the HRD and the DUT, a bitstream that conforms to the video coding standard. The HRD may process the bitstream in the manner described above with regard to the bitstream conformance test. The device may determine that the DUT conforms to the video coding standard if the order of decoded pictures output by the DUT matches the order of decoded pictures output by the HRD. Moreover, the device may determine that the DUT conforms to the video coding standard if the timing with which the DUT outputs decoded pictures matches the timing with which the HRD outputs the decoded pictures.

In the H.264/AVC and HEVC HRD models, decoding and/or CPB removal may be access unit-based. That is, the HRD is assumed to decode complete access units at one time and remove complete access units from the CPB. Furthermore, in the H.264/AVC and HEVC HRD models, it is assumed that picture decoding is instantaneous. Video encoder 20 may signal, in picture timing SEI messages, decoding times to start decoding of access units. In practical applications, if a conforming video decoder strictly follows the decoding times signaled to start decoding of access units, the earliest possible time to output a particular decoded picture is equal to the decoding time of that particular picture plus the time needed for decoding that particular picture. However, in the real world, the time needed for decoding a picture cannot be equal to zero.

HRD parameters may control various aspects of the HRD. In other words, the HRD may rely on the HRD parameters. The HRD parameters may include an initial CPB removal delay, a CPB size, a bit rate, an initial DPB output delay, and a DPB size. Video encoder 20 may signal these HRD parameters in a hrd_parameters( ) syntax structure specified in a video parameter set (VPS) and/or a sequence parameter set (SPS). Individual VPS's and/or SPS's may include multiple hrd_parameters( ) syntax structures for different sets of HRD parameters. In some examples, video encoder 20 may signal HRD parameters in buffering period SEI messages or picture timing SEI messages.

As explained above, an operation point of a bitstream is associated with a set of layer identifiers (i.e., a set of nuh_reserved_zero_6 bits values) and a temporal identifier. An operation point representation may include each NAL unit that is associated with an operation point. An operation point representation may have a different frame rate and/or bit rate than an original bitstream. This is because the operation point representation may not include some pictures and/or some of the data of the original bitstream. Hence, if video decoder 30 were to remove data from the CPB and/or the DPB at a particular rate when processing the original bitstream and if video decoder 30 were to remove data from the CPB and/or the DPB at the same rate when processing an operation point representation, video decoder 30 may remove too much or too little data from the CPB and/or the DPB. Accordingly, video encoder 20 may signal different sets of HRD parameters for different operation points. For instance, video encoder 20 may include, in a VPS, multiple hrd_parameters( ) syntax structures that include HRD parameters for different operation points.

Table 1, below, is an example syntax for a hrd_parameters( ) syntax structure in HEVC.

TABLE 1

HRD Parameters

| hrd_parameters( commonInfPresentFlag, MaxNumSubLayersMinus1 ) { | Descriptor |
|---|---|
| if( commonInfPresentFlag ) { | |
|   timing_info_present_flag | u(1) |
|   if( timing_info_present_flag ) { | |
|     num_units_in_tick | u(32) |
|     time_scale | u(32) |
|   } | |
|   nal_hrd_parameters_present_flag | u(1) |
|   vcl_hrd_parameters_present_flag | u(1) |
|   if( nal_hrd_parameters_present_flag || vcl_hrd_parameters_present_flag ){ | |
|     sub_pic_cpb_params_present_flag | u(1) |
|     if( sub_pic_cpb_params_present_flag ) { | |
|       tick_divisor_minus2 | u(8) |
|       du_cpb_removal_delay_length_minus1 | u(5) |
|     } | |
|     bit_rate_scale | u(4) |
|     cpb_size_scale | u(4) |
|     initial_cpb_removal_delay_length_minus1 | u(5) |
|     cpb_removal_delay_length_minus1 | u(5) |
|     dpb_output_delay_length_minus1 | u(5) |
|   } | |
| } | |
| for( i = 0; i <= MaxNumSubLayersMinus1; i++ ) { | |
|   fixed_pic_rate_flag[ i ] | u(1) |
|   if( fixed_pic_rate_flag[ i ] ) | |
|     pic_duration_in_tc_minus1[ i ] | ue(v) |
|   low_delay_hrd_flag[ i ] | u(1) |
|   cpb_cnt_minus1[ i ] | ue(v) |
|   if( nal_hrd_parameters_present_flag ) | |
|     sub_layer_hrd_parameters( i ) | |
|   if( vcl_hrd_parameters_present_flag ) | |
|     sub_layer_hrd_parameters( i ) | |
| } | |
| } | |

In the example of Table 1, above, and other syntax tables of this disclosure, syntax elements with type descriptor ue(v) may be variable-length unsigned integers encoded using 0t order exponential Golomb (Exp-Golomb) coding with left bit first. In the example of Table 1 and the following tables, syntax elements having descriptors of the form u(n), where n is a non-negative integer, are unsigned values of length n.

The SEI mechanism supported in both H.264/AVC and HEVC enables video encoders (e.g., video encoder 20) to include such metadata in the bitstream that is not required for correct decoding of the sample values of the output pictures, but can be used for various other purposes, such as picture output timing, displaying, as well as loss detection and concealment. Video encoder 20 may use SEI messages to include, in the bitstream, metadata that is not required for correct decoding of the sample values of pictures. However, video decoder 30 or other devices may use the metadata included in SEI messages for various other purposes. For example, video decoder 30 or another device may use the metadata in SEI messages for picture output timing, picture displaying, loss detection, and error concealment.

Video encoder 20 may include one or more SEI NAL units in an access unit. In other words, any number of SEI NAL units may be associated with an access unit. Furthermore, each SEI NAL unit may contain one or more SEI messages. That is, video encoders can include any number of SEI NAL units in an access unit, and each SEI NAL unit may contain one or more SEI messages. A SEI NAL unit may include a NAL unit header and a payload. The NAL unit header of the SEI NAL unit includes at least a first syntax element and a second syntax element. The first syntax element specifies a layer identifier of the SEI NAL unit. The second syntax element specifies a temporal identifier of the SEI NAL unit.

A nested SEI message refers to an SEI message that is contained in a scalable nesting SEI message. A non-nested SEI message refers to an SEI message that is not contained in a scalable nesting SEI message. The payload of the SEI NAL unit may comprise a nested SEI message or a non-nested SEI message.

The HEVC standard describes the syntax and semantics for various types of SEI messages. However, the HEVC standard does not describe the handling of the SEI messages because the SEI messages do not affect the normative decoding process. One reason to have SEI messages in the HEVC standard is to enable supplemental data being interpreted identically in different systems using HEVC. Specifications and systems using HEVC may require video encoders to generate certain SEI messages or may define specific handling of particular types of received SEI messages.

Table 2, below, lists SEI messages specified in HEVC and briefly describes their purposes.

TABLE 2

Overview of SEI messages

| SEI message | Purpose |
|---|---|
| Buffering period | Initial delays for hypothetical reference decoder (HRD) operation |
| Picture timing | Picture output time and picture/sub-picture removal time for HRD operation |
| Pan-scan rectangle | Displaying at a different picture aspect ratio (PAR) than the PAR of the output pictures |
| Filler payload | Adjusting the bitrate to meet specific constraints |
| User data registered | SEI messages to be specified by external entities |
| User data unregistered | |
| Recovery point | Additional information for clean random access. Gradual decoding refresh. |
| Scene information | Information about scene changes and transitions |
| Full-frame snapshot | Indication to label the associated decoded picture as a still-image snapshot of the video content |
| Progressive refinement segment | Indicates that certain consecutive pictures represent a progressive refinement of the quality of a picture rather than a moving scene |
| Film grain characteristics | Enables decoders to synthesize film grain |
| Deblocking filter display preference | Recommends whether or not displayed pictures should undergo the in-loop deblocking filter process |
| Post-filter hint | Provides suggested post-filter coefficients or correlation information for post-filter design |
| Tone mapping information | Remapping to another color space than that used or assumed in encoding |
| Frame packing arrangement | Packing of stereoscopic video into an HEVC bitstream |
| Display orientation | Specifies flipping and/or rotation that should be applied to the output pictures when they are displayed |
| Field indication | Provides information related to interlaced video content and/or field coding, e.g. indicates whether the picture is a progressive frame, a field, or a frame containing two interleaved fields |
| Decoded picture hash | Checksum of the decoded picture, which may be used for error detection |
| Sub-picture timing | Sub-picture removal time for HRD operation |
| Active parameter sets | Provides information on active VPS, SPS, etc. |
| Structure of Pictures description | Describes the temporal and inter prediction structure of the bitstream |

In HEVC Working Draft 9, HRD operations require parameters signaled in buffering period SEI messages, picture timing SEI messages and sometimes also in decoding unit information SEI messages.

Furthermore, in HEVC Working Draft 9, the operation points, layers, or sub-layers applicable to a nested SEI message are specified by the semantics of a scalable nesting SEI message. In other words, the applicable access units, also referred to as the persistence scope, for each SEI message is specified by the semantics of the SEI message, and the applicable operation points or layers or sub-layers for a nested SEI message is specified by the semantics of the scalable nesting SEI message, and within the application operation points or layers or sub-layers. However, in HEVC Working Draft 9, it is not clear which operation points, layers, or sub-layers are applicable to non-nested SEI messages. Consequently, video decoders may be unable to use non-nested SEI messages. For example, buffering SEI messages, nested picture timing SEI messages and nested decoding unit information SEI messages may contain HRD parameters. For ease of explanation, these types of SEI messages may be referred to herein as "HRD SEI message types."

In HEVC Working Draft 9, only nested SEI messages belonging to the HRD SEI message types may be used in HRD operations. In contrast, non-nested SEI messages belonging to the HRD SEI message types may not be used in HRD operations. That is, in HEVC Working Draft 9, only nested buffering period SEI messages, picture timing SEI messages and decoding unit information SEI messages may be chosen to be used in HRD operations, while non-nested buffering period SEI messages, picture timing SEI messages and decoding unit information SEI messages, even when present, are never chosen for use in HRD operations.

The techniques of this disclosure provide a design to allow each type of non-nested SEI message to indicate operation points, layers, or sub-layers applicable to the non-nested SEI message. For instance, in accordance with the techniques of this disclosure, the applicable operation points or layers or sub-layers for each type of non-nested SEI messages are clearly specified and the selection and use of non-nested buffering period SEI messages, picture timing SEI messages and decoding unit information SEI messages in HRD operations are specified.

A device (such as video decoder 30) may determine a set of one or more operation points, layers, or sub-layers to which the non-nested SEI message is applicable. The device may modify, based at least in part on the non-nested SEI message, one or more HRD parameters. The HRD parameters may control various aspects of how video decoder 30 decodes operation points, layers, or sub-layers. Video decoder 30 may use the modified HRD parameters when decoding video data.

In accordance with the techniques of this disclosure, an SEI message may be applicable to layers with temporal IDs smaller than the temporal ID of the SEI NAL unit that contains the SEI message only when the SEI message is a nested SEI message. A non-nested SEI message is not applicable to layers with smaller temporal IDs than the temporal ID of the SEI NAL unit that contains the non-nested SEI message. That is, for an SEI message to be applied to layers with temporal level (TemporalId) smaller than that of the SEI NAL unit containing the SEI message, the SEI message has to be nested. In other words, a non-nested SEI message is not applicable to layers with smaller TemporalId values.

Furthermore, in accordance with the techniques of this disclosure, a SEI NAL unit that contains a non-nested SEI message belonging to a SEI message type other than the HRD SEI message types (i.e., a SEI message type other than buffering period SEI messages, picture timing SEI messages, and decoding unit SEI messages) may be required to have the same temporal ID as the access unit containing the SEI NAL unit. In other words, an SEI NAL unit containing non-nested SEI messages of any currently-specified types of SEI messages other than buffering period SEI messages, picture timing SEI messages, and decoding unit information SEI messages is required to have the same TemporalId as that of the access unit containing the SEI NAL unit.

For instance, payloadType may specify the type of a SEI message. Furthermore, an operation point is identified by a set of nuh_reserved_zero_6 bits values, denoted as OpLayerIdSet, and a TemporalId value, denoted as OpTid. If payloadType is equal to 0 (buffering period), 1 (picture timing), or 130 (decoding unit information), the non-nested SEI message is applicable to the operation point that has OpTid equal to nuh_temporal_id_plus1 of the SEI NAL unit containing the SEI message minus 1 and that has OpLayerIdSet containing all integer values in the range of 0 to nuh_reserved_zero_6 bits of the SEI NAL unit containing the SEI message, inclusive. nuh_temporal_id_plus1, minus 1, specifies a temporal ID of the SEI NAL unit nuh_reserved_zero_6 bits may specify a layer identifier. Thus, the non-nested SEI message may be applicable to an operation point that has a temporal identifier equal to a temporal identifier of the SEI NAL unit and that has a set of layer identifiers contained in a range from 0 to a layer identifier of the SEI NAL unit.

Thus, in some example techniques of this disclosure, a device (such as video encoder 20, video decoder 30, or another device) may obtain, from the bitstream, a non-nested SEI message, where the non-nested SEI message is a buffering period SEI message that indicates initial delays for HRD operations, a picture timing SEI message that indicates picture output times and picture/sub-picture removal times for HRD operations, or a decoding unit SEI message that indicates sub-picture removal times for HRD operations. Furthermore, the device may determine an operation point applicable to the non-nested SEI message. A highest temporal identifier of all NAL units of the operation point applicable to the non-nested SEI message is equal to a temporal identifier of a SEI NAL unit that encapsulates the non-nested SEI message. A set of layer identifiers of all the NAL units of the operation point applicable to the non-nested SEI message contains all integer values in the range of 0 to the value of the layer identifier of the SEI NAL unit that encapsulates the non-nested SEI message. In addition, the device may perform, based in part on values of one or more syntax elements of the second non-nested SEI message, an HRD operation (e.g., a bitstream conformance test, a decoder conformance test, etc.) with regard to the operation point applicable to the second non-nested SEI message.

Otherwise, when payloadType is equal to 2, 3, 6, 9, 15, 16, 17, 19, 22, 23, 45, 47, 128, 129, 131, or 134, the non-nested SEI message may apply to the layer for which the VCL NAL units have nuh_reserved_zero_6 bits equal to the nuh_reserved_zero_6 bits of the SEI NAL unit containing the SEI message, and the TemporalId of the SEI NAL unit containing the SEI message shall be equal to the TemporalId of the access unit containing the SEI message.

When payloadType is equal to 2, 3, 6, 9, 15, 16, 17, 19, 22, 23, 45, 47, 128, 129, 131, or 134, the non-nested SEI message is one of: a pan-scan rectangle SEI message that includes data associated with displaying at a different picture aspect ratio than a picture aspect ratio of output pictures; a filler payload SEI message that includes data for adjusting a bit rate to meet specific constraints; a recovery point SEI message that includes information for clean random access or gradual decoding refresh; a scene information SEI message that includes information associated with scene changes and transitions; a picture snapshot SEI message that includes an indication to label an associated decoded picture as a still-image snapshot of video content; a progressive refinement segment start SEI message that includes information associated with a start of a segment of consecutive pictures that represent a progressive refinement of quality of a picture rather than a moving scene; a progressive refinement segment end SEI message that includes information associated with an end of the segment of consecutive pictures; a film grain characteristics SEI message that includes information associated with synthesizing film grain effects; a post filter hint SEI message that includes information associated with suggested post-filter coefficients or correlation information for post-filter design; a tone mapping information SEI message that includes information associated with remapping to another color space than that used or assumed in encoding; a frame packing arrangement SEI message that includes information associated with packing of stereoscopic video into the bitstream; a display orientation SEI message that includes information that specifies flipping and/or rotation to be applied to the output pictures when the output pictures are displayed; a structure of pictures information SEI message that includes information that describes temporal and inter prediction structure of the bitstream; an active parameter sets SEI message that includes information on an active parameter set; a temporal sub-layer zero index SEI message that includes information associated with detecting when coded pictures with temporal identifiers equal to 0 are missing; or a region refresh information SEI message that includes information that indicates whether slice segments to which the non-nested SEI message applies belong to a refreshed region of a current picture, respectively.

In this way, a device (such as video encoder 20, video decoder 30, or another device) may obtain, from a bitstream that includes an encoded representation of the video data, a non-nested SEI message that is not nested within another SEI message in the bitstream. Furthermore, the device may determine a layer of the bitstream to which the non-nested SEI message is applicable, wherein the non-nested SEI message is applicable to layers for which VCL NAL units of the bitstream have layer identifiers equal to a layer identifier of a SEI NAL unit that encapsulates the non-nested SEI message. A temporal identifier of the SEI NAL unit is equal to a temporal identifier of an access unit containing the SEI NAL unit. The video coder may process, based in part on one or more syntax elements in the non-nested SEI message, video data of the layer of the bitstream to which the non-nested SEI message is applicable. In some examples, processing the video data of the layer of the bitstream to which the non-nested SEI message is applicable comprises decoding, based in part on the one or more syntax elements in the non-nested SEI message, the video data of the layer of the bitstream to which the non-nested SEI message is applicable.

Figure 2:
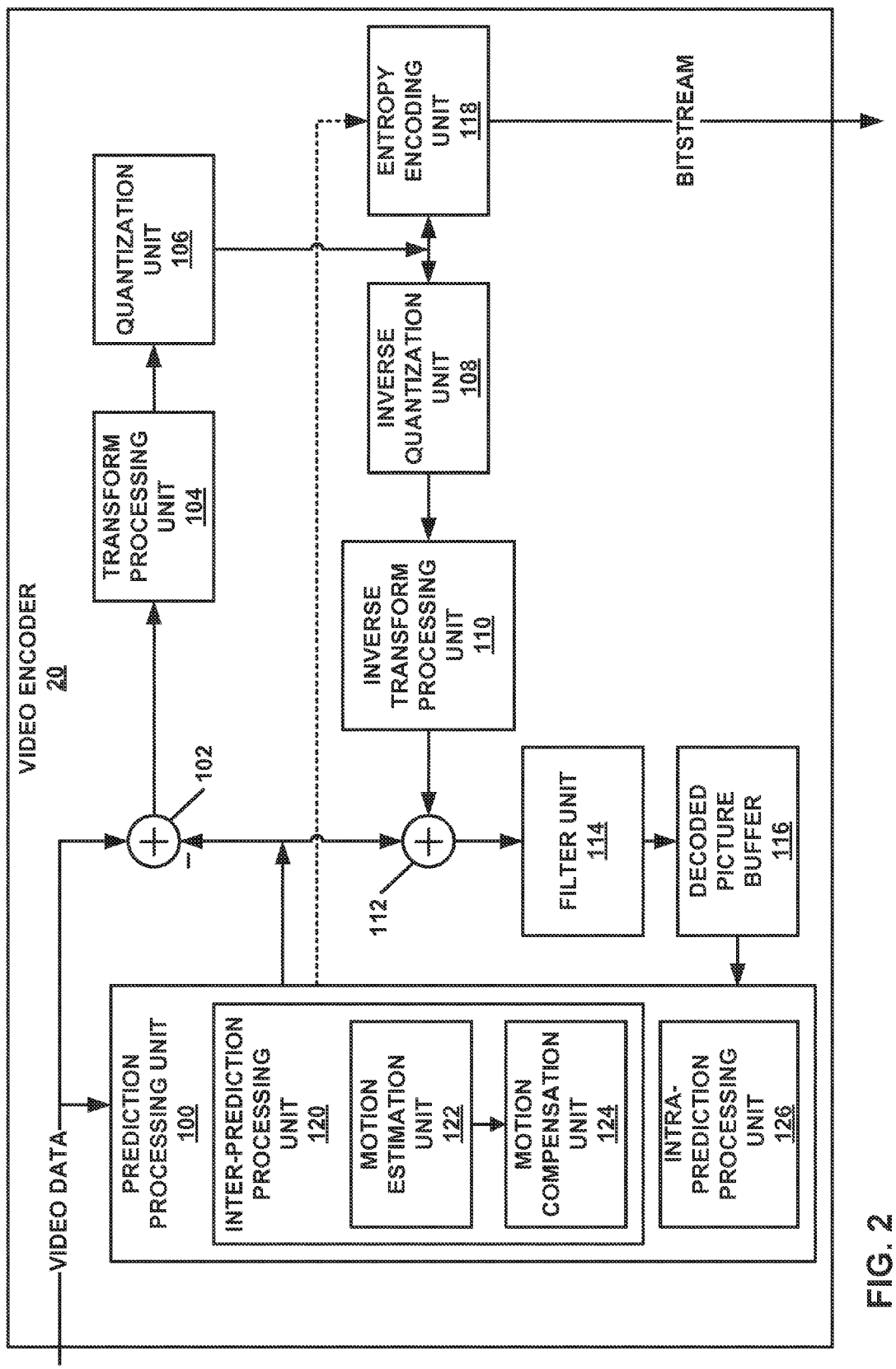
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb, and Cr coding block of a CU and the selected predictive luma, Cb, and Cr blocks of the PUs of the CU, luma, Cb, and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118.

Figure 3:
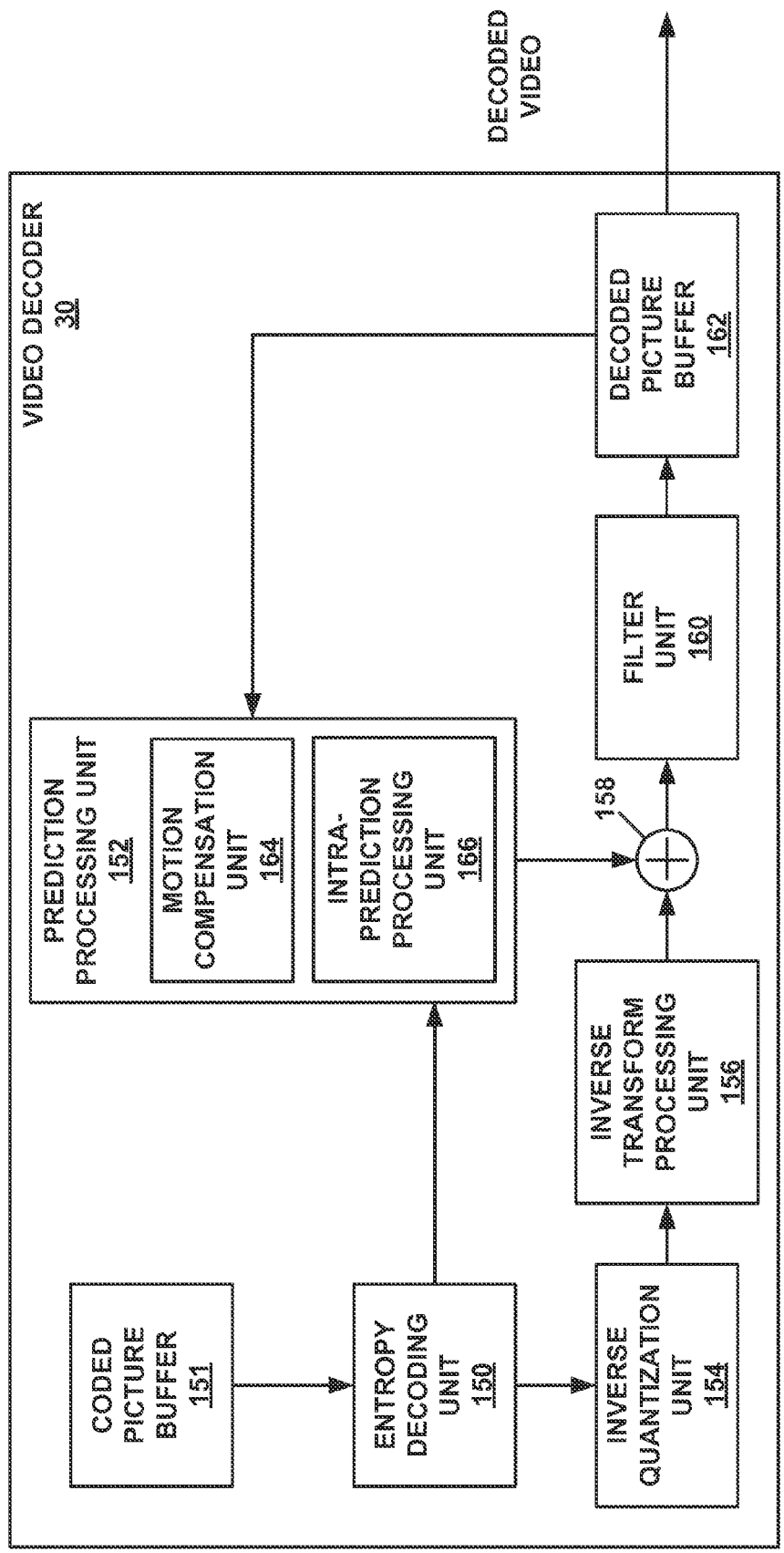
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. Entropy decoding unit 150 may receive NAL units from CPB 151 and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice.

In addition to decoding syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive luma, Cb, and Cr blocks for the PU.

Reconstruction unit 158 may use the residual values from the luma, Cb, and Cr transform blocks associated with TUs of a CU and the predictive luma, Cb, and Cr blocks of the PUs of the CU, i.e., either intra-prediction data or inter-prediction data, as applicable, to reconstruct the luma, Cb, and Cr coding blocks of the CU. For example, reconstruction unit 158 may add samples of the luma, Cb, and Cr transform blocks to corresponding samples of the predictive luma, Cb, and Cr blocks to reconstruct the luma, Cb, and Cr coding blocks of the CU.

Filter unit 160 may perform a deblocking operation to reduce blocking artifacts associated with the luma, Cb, and Cr coding blocks of the CU. Video decoder 30 may store the luma, Cb, and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

In some examples, a video processor (such as video encoder 20, video decoder 30, or another device) may perform a bitstream conformance test to determine whether a bitstream conforms to a video coding specification. This bitstream may be referred to as BitstreamToDecode or bitstream-to-decode. BitstreamToDecode may be the same as a bitstream received by the video processor or a sub-bitstream of the bitstream received by the video processor. Subclause C.1 of HEVC Working Draft 9 describes the HRD of HEVC and the use of the HRD to check bitstream and decoder conformance. Specifically, subclause C.1 of HEVC Working Draft 9 specifies a series of ordered steps applied in a bitstream conformance test. In accordance with one or more example techniques of this disclosure, the portion of subclause C.1 of HEVC Working Draft 9 describing this series of ordered steps is changed as follows such that non-nested buffering period SEI messages, picture timing SEI messages and decoding unit information SEI messages may be chosen for use in HRD operations:

Multiple tests may be needed for checking the conformance of a bitstream, which is referred to as the bitstream under test in the following. For each test, the following steps apply in the order listed:

1. An operation point under test, denoted as TargetOp, is selected. The OpLayerIdSet of TargetOp contains the set of nuh_reserved_zero_6 bits values present in the bitstream subset associated with TargetOp, which is a subset of nuh_reserved_zero_6 bits values present in the bitstream under test. The OpTid of TargetOp is equal to the highest TemporalId present in the bitstream subset associated with TargetOp.
2. TargetDecLayerIdSet is set to OpLayerIdSet of TargetOp, and HighestTid is set to OpTid of TargetOp, and BitstreamToDecode is set to the bitstream subset associated with TargetOp, i.e., the output of the sub-bitstream extraction process as specified in subclause 10.1 of HEVC Working Draft 9 with the bitstream under test, HighestTid and TargetDecLayerIdSet as inputs.
3. The hrd_parameters( ) syntax structure and the sub_layer_hrd_parameters( ) syntax structure applicable to TargetOp are selected. If TargetDecLayerIdSet contains all nuh_reserved_zero_6 bits values present in the bitstream under test, the hrd_parameters( ) syntax structure in the active sequence parameter set (or provided through an external means not specified in this Specification) is selected. Otherwise, the hrd_parameters( ) syntax structure in the active video parameter set (or provided through some external means not specified in this Specification) that applies to TargetOp is selected. Within the selected hrd_parameters( ) syntax structure, if BitstreamToDecode is a Type I bitstream, the sub_layer_hrd_parameters(HighestTid) syntax structure that immediately follows the condition "if(vcl_hrd_parameters_present_flag)" is selected and the variable NalHrdModeFlag is set equal to 0; otherwise (BitstreamToDecode is a Type II bitstream), the sub_layer_hrd_parameters(HighestTid) syntax structure that immediately follows either the condition "if (vcl_hrd_parameters_present_flag)" (in this case the variable NalHrdModeFlag is set equal to 0) or the condition "if(nal_hrd_parameters_present_flag)" (in this case the variable NalHrdModeFlag is set equal to 1) is selected. When BitstreamToDecode is a Type II bitstream and NalHrdModeFlag is equal to 0, all non-VLC NAL units except for filler data NAL units are discarded from BitstreamToDecode, and the remaining bitstream is assigned to BitstreamToDecode.
4. An access unit associated with a buffering period SEI message (present in BitstreamToDecode or available through external means not specified in this Specification) applicable to TargetOp is selected as the HRD initialization point and referred to as access unit 0.
5. For each access unit in BitstreamToDecode starting from access unit 0, the buffering period SEI message (present in BitstreamToDecode or available through external means not specified in this Specification) that is associated with the access unit and applies to TargetOp is selected, the picture timing SEI message (present in BitstreamToDecode or available through external means not specified in this Specification) that is associated with the access unit and applies to TargetOp is selected, and when SubPicCpbFlag is equal to 1 and sub_pic_cpb_params_in_pic_timing_sei_flag is equal to 0, the decoding unit information SEI messages (present in BitstreamToDecode or available through external means not specified in this Specification) that are associated with decoding units in the access unit and apply to TargetOp are selected.
6. A value of SchedSelIdx is selected. The selected SchedSelIdx shall be in the range of 0 to cpb_cnt_minus1 [HighestTid], inclusive, where cpb_cnt_minus1 [HighestTid] is found in the sub_layer_hrd_parameters (HighestTid) syntax structure as selected above.
7. When the coded picture in access unit 0 has nal_unit_type equal to CRA_NUT or BLA_W_LP, and rap_cpb_params_present_flag in the selected buffering period SEI message is equal to 1, either of the following applies for selection of the initial CPB removal delay and delay offset.

The default initial CPB removal delay and delay offset represented by initial_cpb_removal_delay[SchedSelIdx] and initial_cpb_removal_offset[SchedSelIdx] are selected depending on NalHrdModeFlag as specified under step 3 above, the variable DefaultInitCpbParamsFlag is set equal to 1.

The alternative initial CPB removal delay and delay offset represented by initial_alt_cpb_removal_delay [SchedSelIdx] and initial_alt_cpb_removal_offset [SchedSelIdx] selected depending on NalHrdModeFlag as specified under step 3 above, the variable DefaultInitCpbParamsFlag is set equal to 0, and the RASL access units associated with access unit 0 are discarded from BitstreamToDecode and the remaining bitstream is still assigned to BitstreamToDecode.

8. When sub_pic_cpb_params_present_flag in the selected hrd_parameters( ) syntax structure is equal to 1, the CPB is scheduled to operate either at the access unit level (in which case the variable SubPicCpbFlag is set equal to 0) or at the sub-picture level (in which case the variable SubPicCpbFlag is set equal to 1).

Struck-through portions of the text above indicate text that, in accordance with the techniques of this disclosure, is removed from subclause C.1 of HEVC Working Draft 9. As indicated above, buffering period SEI messages indicate initial delays of HRD operations. As a result of removing the struck-through portions, a video processor may, in step 4, select, as the HRD initialization point, an access unit associated with a buffering period SEI message applicable to TargetOp, regardless of whether the buffering period SEI message is in a scalable nesting SEI message. TargetOp is the set of layer identifiers in BitstreamToDecode. Thus, when a non-nested buffering period SEI message is applicable to TargetOp, the video processor may select, as an HRD initialization point, an access unit associated with the non-nested buffering period SEI message. The video processor may initialize the HRD at the selected access unit. The HRD initialization point may also be referred to as access unit 0. The HRD initialization point may be the first access unit that is evaluated during a HRD operation.

Similarly, in step 5, the video processor may select a buffering period SEI message regardless of whether the buffering period SEI message is in a scalable nesting SEI message. Moreover, in step 5, the video processor may select a picture timing SEI message regardless of whether the picture timing SEI message is in a scalable nesting SEI message. Furthermore, in step 5, the video processor may select a decoding unit information SEI message regardless of whether the decoding unit information SEI message is in a buffering period SEI message. Thus, the video processor may obtain, from the bitstream, a non-nested SEI message, wherein the non-nested SEI message is a buffering period SEI message, a picture timing SEI message, or a decoding unit SEI message. Furthermore, for each respective access unit in a bitstream-to-decode, the video processor may select the non-nested SEI message for the respective access unit when the non-nested SEI message is associated with the access unit and the non-nested SEI message is applicable to the set of layer identifiers in the bitstream-to-decode. The video processor may use one or more syntax elements of the non-nested SEI message in an HRD operation with regard to the respective access unit.

As indicated above, some types of non-nested SEI messages (e.g., buffering period SEI messages, picture timing SEI messages, decoding unit information SEI messages, etc.) are applicable to particular operation points. Moreover, some types of non-nested SEI messages are applicable to particular layers. In accordance with one or more techniques of this disclosure, the following specifies the applicable operation points or layers for particular types of non-nested SEI messages.

A video processor may obtain, from a bitstream, a non-nested SEI message. In addition, the video processor may determine, based on one or more syntax elements of the non-nested SEI message, a payload type variable (e.g., "payloadType") for the non-nested SEI message. If the payloadType of the non-nested SEI message is equal to 0 (i.e., the non-nested SEI message is a buffering period SEI message), the payloadType of the non-nested SEI message is equal to 1 (i.e., the non-nested SEI message is a picture timing SEI message), or the payloadType of the non-nested SEI message is equal to 130 (i.e., the non-nested SEI message is a decoding unit information SEI message), the non-nested SEI message is applicable to the operation point that has OpTid equal to nuh_temporal_id_plus 1 of the SEI NAL unit containing the non-nested SEI message minus 1 and that has OpLayerIdSet containing all integer values in the range of 0 to nuh_reserved_zero_6 bits of the SEI NAL unit containing the SEI message, inclusive. Otherwise, when the payloadType of the non-nested SEI message is equal to 2, 3, 6, 9, 15, 16, 17, 19, 22, 23, 45, 47, 128, 129, 131, or 134, the non-nested SEI message is applicable to the layer for which the VCL NAL units have nuh_reserved_zero_6 bits equal to the nuh_reserved_zero_6 bits of the SEI NAL unit containing the SEI message, and the TemporalId of the SEI NAL unit containing the SEI message shall be equal to the TemporalId of the access unit containing the SEI message. In some examples, when a buffering period SEI message, picture timing SEI message or decoding unit information SEI message is present as a nested SEI message, the same SEI message (with the same content) is not duplicated as a non-nested SEI message at the same time.

In accordance with other example techniques of this disclosure, the applicable operation points or layers for each type of non-nested SEI messages are specified as follows. If the payloadType of a non-nested SEI message is equal to 0 (i.e., the non-nested SEI message is a buffering period SEI message), the payloadType of the non-nested SEI message is equal to 1 (i.e., the non-nested SEI message is a picture timing SEI message), or the payloadType of the non-nested SEI message is equal to 130 (i.e., the non-nested SEI message is a decoding unit information SEI message), the non-nested SEI message is applicable to the operation point that has OpTid equal to nuh_temporal_id_plus 1 of the SEI NAL unit containing the non-nested SEI message minus 1 and that has OpLayerIdSet containing all integer values in the range of 0 to nuh_reserved_zero_6 bits of the SEI NAL unit containing the SEI message, inclusive. Otherwise, when the payloadType of the non-nested SEI message is equal to 2, 3, 6, 9, 15, 16, 17, 19, 22, 23, 45, 47, 128, 129, 131, 134, the non-nested SEI message is applicable to the layers for which the VCL NAL units have nuh_reserved_zero_6 bits greater than or equal to the nuh_reserved_zero_6 bits of the SEI NAL unit containing the SEI message, and the TemporalId of the SEI NAL unit containing the SEI message shall be equal to the TemporalId of the access unit containing the SEI message. For any two non-nested SEI messages of the same type associated with different values of nuh_reserved_zero_6 bits in the SEI NAL units containing the SEI messages in the same access unit, the non-nested SEI message associated with the greater value of nuh_reserved_zero_6 bits is applicable to layers for which the VCL NAL units have nuh_reserved_zero_6 bits greater than or equal to the greater value of nuh_reserved_zero_6 bits. In some examples, when a buffering period SEI message, picture timing SEI message or decoding unit information SEI message is present as a nested SEI message, the same SEI message (with the same content) is not to be duplicated as a non-nested SEI message at the same time.

Figure 4:
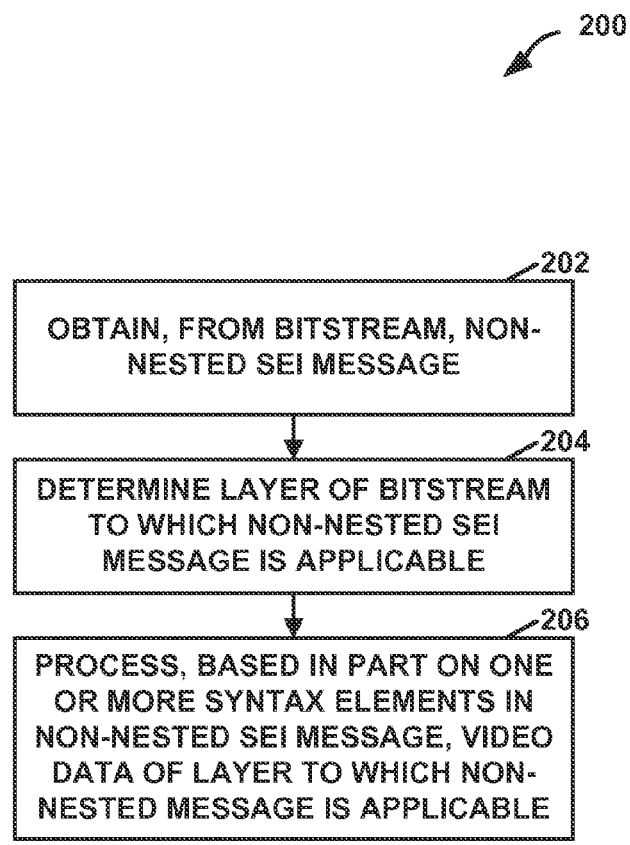
FIG. 4 is a block diagram illustrating an example operation of a video processor, in accordance with one or more techniques of this disclosure.

FIG. 4 is a flowchart illustrating an example operation 200 of a video processing device, in accordance with one or more techniques of this disclosure. In the example of FIG. 4, a video processor (such as video encoder 20, video decoder 30, or another device) may obtain, from a bitstream that includes an encoded representation of video data, a non-nested SEI message that is not nested within another SEI message in the bitstream (202). Furthermore, the video processor may determine a layer of the bitstream to which the non-nested SEI message is applicable, wherein the non-nested SEI message is applicable to layers for which VCL NAL units of the bitstream have layer identifiers equal to a layer identifier of a SEI NAL unit that encapsulates the non-nested SEI message (204). A temporal identifier of the SEI NAL unit is equal to a temporal identifier of an access unit containing the SEI NAL unit. In addition, the video processor may process, based in part on one or more syntax elements in the non-nested SEI message, video data of the layer of the bitstream to which the non-nested SEI message is applicable (206).

Figure 5:
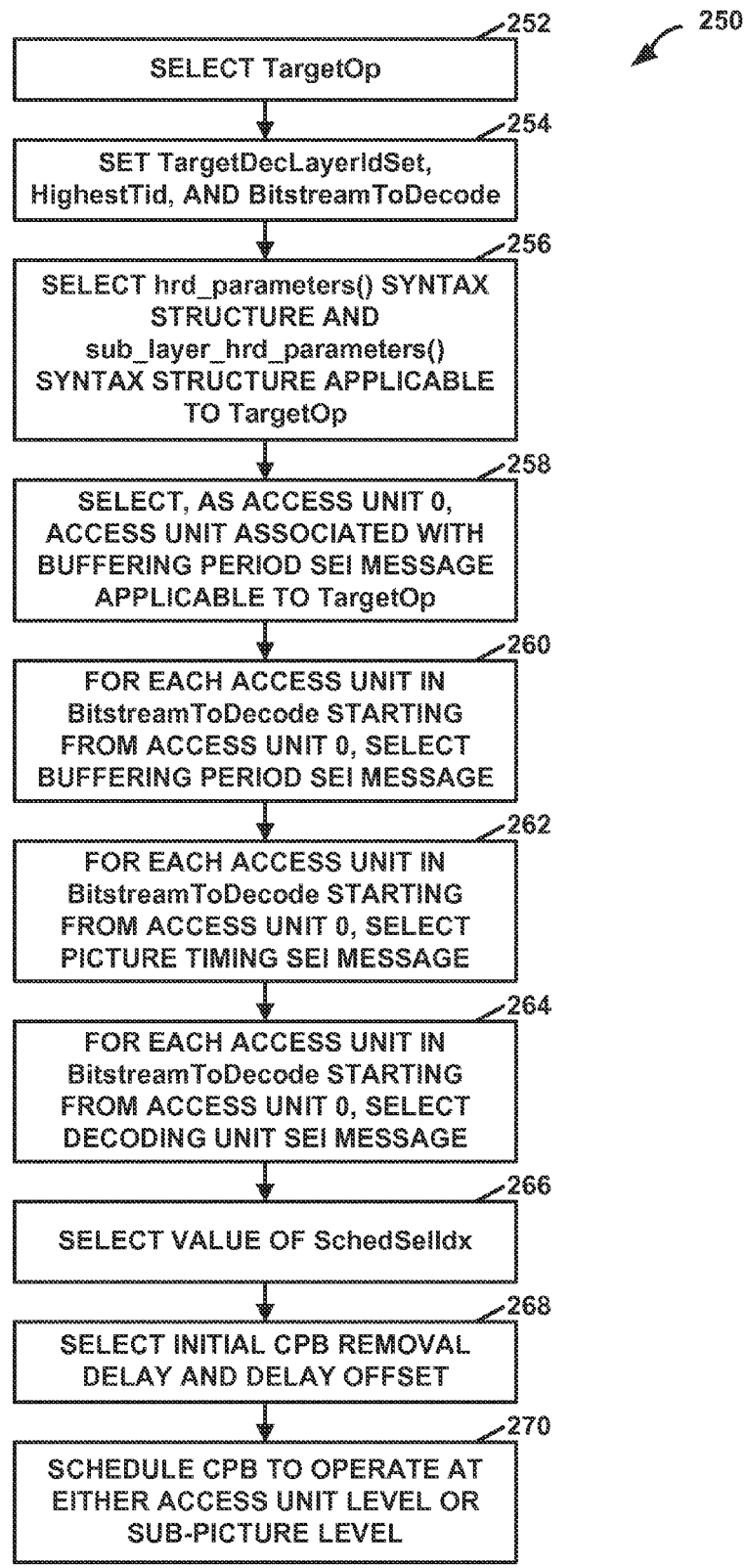
FIG. 5 is a flowchart illustrating an example operation to perform a part of a bitstream conformance test.

FIG. 5 is a flowchart illustrating an example operation 250 to perform a part of a bitstream conformance test. In the example of FIG. 5, a video processor (e.g., video encoder 20, video decoder 30, or another device) may select an operation point under test (i.e., "TargetOp") (252). A layer identifier set (i.e., "OpLayerIdSet") of TargetOp may contain the set of nuh_reserved_zero_6 bits values present in the bitstream subset associated with TargetOp, which is a subset of nuh_reserved_zero_6 bits values present in the bitstream under test.

Furthermore, the video processor may set TargetDecLayerIdSet. HighestTid, and BitstreamToDecode (254). In some examples, the video processor may set TargetDecLayerIdSet to OpLayerIdSet of TargetOp. Furthermore, the video processor may set HighestTid to the highest temporal identifier present in the bitstream subset associated with TargetOp. In addition, the video processor may set BitstreamToDecode to the bitstream subset associated with TargetOp.

Next, the video processor may select a hrd_parameters( ) syntax structure and a sub_layer_hrd_parameters( ) syntax structure applicable to TargetOp (256). In some examples, if TargetDecLayerIdSet contains all nuh_reserved_zero_6 bits values present in the bitstream under test, the video processor selects the hrd_parameters( ) syntax structure in the active sequence parameter set (or provided through an external means). Otherwise, the video processor may select the hrd_parameters( ) syntax structure in the active video parameter set (or provided through some external means) that is applicable to TargetOp. Within the selected hrd_parameters( ) syntax structure, if BitstreamToDecode is a Type I bitstream, the video processor may select the sub_layer_hrd_parameters(HighestTid) syntax structure that immediately follows the condition "if(vcl_hrd_parameters_present_flag)" and the video processor may set the variable NalHrdModeFlag is set equal to 0. Otherwise (i.e., BitstreamToDecode is a Type II bitstream), the video processor selects the sub_layer_hrd_parameters(HighestTid) syntax structure that immediately follows either the condition "if (vcl_hrd_parameters_present_flag)" (in this case the variable NalHrdModeFlag is set equal to 0) or the condition "if(nal_hrd_parameters_present_flag)" (in this case the variable NalHrdModeFlag is set equal to 1). When BitstreamToDecode is a Type II bitstream and NalHrdModeFlag is equal to 0, the video processor may discard from BitstreamToDecode all non-VLC NAL units except for filler data NAL units, and the video processor may assign the remaining bitstream to BitstreamToDecode.

Furthermore, the video processor may select, as access unit 0 (i.e., the HRD initialization point), an access unit associated with a buffering period SEI message applicable to TargetOp (258). In accordance with one or more example techniques of this disclosure, the video processor may select the buffering period SEI message regardless of whether the buffering period SEI message is present in BitstreamToDecode in a scalable nesting SEI message or present in BitstreamToDecode as a non-nested buffering period SEI message.

Next, for each access unit in BitstreamToDecode starting from access unit 0, the video processor may select a buffering period SEI message that is associated with the access unit and is applicable to TargetOp (260). In accordance with one or more example techniques of this disclosure, the video processor may select the buffering period SEI message regardless of whether the buffering period SEI message is present in BitstreamToDecode in a scalable nesting SEI message or present in BitstreamToDecode as a non-nested buffering period SEI message.

In addition, for each access unit in BitstreamToDecode starting from access unit 0, the video processor may select a picture timing SEI message that is associated with the access unit and is applicable to TargetOp (262). In accordance with one or more example techniques of this disclosure, the video processor may select the picture timing SEI message regardless of whether the picture timing SEI message is present in BitstreamToDecode in a scalable nesting SEI message or present in BitstreamToDecode as a non-nested picture timing SEI message.

Furthermore, for each access unit in BitstreamToDecode starting from access unit 0, when SubPicCpbFlag is equal to 1 and sub_pic_cpb_params_in_pic_timing_sei_flag is equal to 0, the video processor may select the decoding unit information SEI messages that are associated with decoding units in the access unit and apply to TargetOp (264). In accordance with one or more example techniques of this disclosure, the video processor may select the decoding unit information SEI messages regardless of whether the decoding unit information SEI messages are present in BitstreamToDecode in scalable nesting SEI messages or present in BitstreamToDecode as non-nested decoding unit information SEI messages. SubPicCpbFlag is a variable that indicates whether the CPB is scheduled to operate at an access unit level or a sub-picture level. sub_pic_cpb_params_in_pic_timing_sei_flag is a syntax element that indicates whether sub-picture CPB removal delay parameters are present in picture timing SEI messages and whether decoding unit information SEI messages are available.

Next, the video processor may select a value of SchedSelIdx (266). The selected SchedSelIdx is in the range of 0 to cpb_cnt_minus1 [HighestTid], inclusive, where cpb_cnt_minus 1 [HighestTid] is found in the sub_layer_hrd_parameters(HighestTid) syntax structure as selected above. cpb_cnt_minus1[ ] is an array of syntax elements in a hrd_parameters( ) syntax structure. cpb_cnt_minus1 [i] indicates the number of alternative CPB specifications in the bitstream of a coded video sequence when HighestTid is equal to i.

When the coded picture in access unit 0 has nal_unit_type equal to CRA_NUT or BLA_W_LP, and rap_cpb_params_present_flag in the selected buffering period SEI message is equal to 1, the video processor may select an initial CPB removal delay and delay offset (268). The buffering period SEI message may include initial_cpb_removal_delay[i] syntax elements, initial_cpb_removal_offset[i] syntax elements, and a rap_cpb_params_present_flag syntax element. The rap_cpb_params_present_flag syntax element indicates whether initial_alt_cpb_removal_delay[i] and initial_alt_cpb_removal_offset[i] syntax elements are present in the buffering period SEI message. initial_cpb_removal_delay[i] and initial_alt_cpb_removal_delay[i] specify default and alternative initial CPB removal delays, respectively, for the i-th CPB. initial_cpb_removal_offset[i] and initial_alt_cpb_removal_offset[i] specify default and alternative initial CPB removal offsets, respectively, for the i-th CPB to specify the initial delivery time of coded data units to the CPB.

Either of the following may apply for selection of the initial CPB removal delay and delay offset. First, the video processor may select the default initial CPB removal delay and delay offset represented by initial_cpb_removal_delay[SchedSelIdx] and initial_cpb_removal_offset[SchedSelIdx], depending on NalHrdModeFlag as specified above, the variable DefaultInitCpbParamsFlag is set equal to 1. Second, the video processor may select the alternative initial CPB removal delay and delay offset represented by initial_alt cpb_removal_delay[SchedSelIdx] and initial_alt_cpb_removal_offset[SchedSelIdx], depending on NalHrdModeFlag as specified above, the variable DefaultInitCpbParamsFlag is set equal to 0, and the Random Access Skipped Leading (RASL) access units associated with access unit 0 are discarded from BitstreamToDecode and the remaining bitstream is still assigned to BitstreamToDecode.

Furthermore, when sub_pic_cpb_params_present_flag in the selected hrd_parameters( ) syntax structure is equal to 1, the video processor may schedule the CPB to operate either at the access unit level (in which case the variable SubPicCpbFlag is set equal to 0) or at the sub-picture level (in which case the variable SubPicCpbFlag is set equal to 1) (270). sub_pic_cpb_params_present_flag is a syntax element in a hrd_parameters( ) syntax structure that indicates whether sub-picture CPB removal delay parameters are present and whether the CPB may operate at access unit level or sub-picture level.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:

obtaining, from a bitstream of coded video data that includes a sequence of network abstraction layer (NAL) units, a non-nested Supplemental Enhancement Information (SEI) message, wherein the non-nested SEI message is not nested within a scalable nesting SEI message in the bitstream and the non-nested SEI message is not a buffering period SEI message, a picture timing SEI message, or a decoding unit information SEI message;

determining a layer of the bitstream to which the non-nested SEI message is applicable, wherein the layer to which the non-nested SEI message is applicable is a layer for which video coding layer (VCL) NAL units of the bitstream have layer identifiers equal to a layer identifier specified in a SEI NAL unit that encapsulates the non-nested SEI message, and wherein a temporal identifier specified in the SEI NAL unit is required to be equal to a temporal identifier of an access unit containing the SEI NAL unit; and processing, based in part on data in the non-nested SEI message, video data of the layer of the bitstream to which the non-nested SEI message is applicable.

2. The method of claim 1, wherein:

the SEI NAL unit includes a NAL unit header and a payload, the NAL unit header of the SEI NAL unit includes at least a first syntax element and a second syntax element, the first syntax element specifies the layer identifier specified in the SEI NAL unit, the second syntax element specifies the temporal identifier specified in the SEI NAL unit, and the payload of the SEI NAL unit includes the non-nested SEI message.

3. The method of claim 1, wherein the non-nested SEI message is one of:

a pan-scan rectangle SEI message that includes data associated with displaying at a different picture aspect ratio than a picture aspect ratio of output pictures, a filler payload SEI message that includes data for adjusting a bit rate to meet specific constraints, a recovery point SEI message that includes information for clean random access or gradual decoding refresh, a scene information SEI message that includes information associated with scene changes and transitions, a picture snapshot SEI message that includes an indication to label an associated decoded picture as a still-image snapshot of video content, a progressive refinement segment start SEI message that includes information associated with a start of a segment of consecutive pictures that represent a progressive refinement of quality of a picture rather than a moving scene, a progressive refinement segment end SEI message that includes information associated with an end of the segment of consecutive pictures, a film grain characteristics SEI message that includes information associated with synthesizing film grain effects,
a post filter hint SEI message that includes information associated with suggested post-filter coefficients or correlation information for post-filter design,
a tone mapping information SEI message that includes information associated with remapping to another color space than that used or assumed in encoding,
a frame packing arrangement SEI message that includes information associated with packing of stereoscopic video into the bitstream,
a display orientation SEI message that includes information that specifies flipping and/or rotation to be applied to the output pictures when the output pictures are displayed,
a structure of pictures information SEI message that includes information that describes temporal and inter prediction structure of the bitstream,
a temporal sub-layer zero index SEI message that includes information associated with detecting when coded pictures with temporal identifiers equal to 0 are missing, or
a region refresh information SEI message that includes information that indicates whether slice segments to which the non-nested SEI message applies belong to a refreshed region of a current picture.

4. The method of claim 3, wherein the method further comprises determining, based on one or more syntax elements of the non-nested SEI message, a payload type variable for the non-nested SEI message, wherein:
the payload type variable for the non-nested SEI message indicates a payload type of the non-nested SEI message, and
the payload type variable for the non-nested SEI message is equal to 2, 3, 6, 9, 15, 16, 17, 19, 22, 23, 45, 47, 128, 131, or 134.

5. The method of claim 1, wherein:
the non-nested SEI message is a first non-nested SEI message, and
the method further comprises:
obtaining, from the bitstream, a second non-nested buffering period SEI message that indicates initial delays for hypothetical reference decoder (HRD) operations;
when the second non-nested buffering period SEI message is applicable to TargetOp, selecting, as an HRD initialization point, an access unit associated with the second non-nested buffering period SEI message, wherein TargetOp is the set of layer identifiers in a bitstream-to-decode, the bitstream-to-decode being the bitstream or a sub-stream of the bitstream; and
initializing a HRD at the selected access unit.

6. The method of claim 1, wherein:
the non-nested SEI message is a first non-nested SEI message, and
the method further comprises:
obtaining, from the bitstream, a second non-nested SEI message, the second non-nested SEI message being a buffering period SEI message that indicates initial delays for HRD operations, a picture timing SEI message that indicates picture output times and picture/sub-picture removal times for HRD operations, or a decoding unit SEI message that indicates sub-picture removal times for HRD operations; and
for each respective access unit in a bitstream-to-decode:
selecting the second non-nested SEI message for the respective access unit when the second non-nested SEI message is associated with the access unit and the second non-nested SEI message is applicable to the set of layer identifiers in the bitstream-to-decode, wherein the bitstream-to-decode is the bitstream or a sub-bitstream of the bitstream; and
using one or more syntax elements of the second non-nested SEI message in an HRD operation with regard to the respective access unit.

7. The method of claim 1, wherein:
the non-nested SEI message is a first non-nested SEI message, and
the method further comprises:
obtaining, from the bitstream, a second non-nested SEI message, the second non-nested SEI message being a buffering period SEI message that indicates initial delays for HRD operations, a picture timing SEI message that indicates picture output times and picture/sub-picture removal times for HRD operations, or a decoding unit SEI message that indicates sub-picture removal times for HRD operations;
determining an operation point applicable to the second non-nested SEI message,
wherein a highest temporal identifier specified in all NAL units of the operation point applicable to the second non-nested SEI message is equal to a temporal identifier specified in a SEI NAL unit that encapsulates the second non-nested SEI message, and
wherein a set of layer identifiers of all the NAL units of the operation point applicable to the second non-nested SEI message contains all integer values in the range of 0 to the layer identifier specified in the SEI NAL unit that encapsulates the second non-nested SEI message; and
performing, based in part on values of one or more syntax elements of the second non-nested SEI message, an HRD operation with regard to the operation point applicable to the second non-nested SEI message.

8. A video processing device comprising one or more processors configured to:
obtain, from a bitstream of coded video data that includes a sequence of network abstraction layer (NAL) units, a non-nested Supplemental Enhancement Information (SEI) message, wherein the non-nested SEI message is not nested within a scalable nesting SEI message in the bitstream and the non-nested SEI message is not a buffering period SEI message, a picture timing SEI message, or a decoding unit information SEI message;
determine a layer of the bitstream to which the non-nested SEI message is applicable, wherein the layer to which the non-nested SEI message is applicable is a layer for which video coding layer (VCL) NAL units of the bitstream have layer identifiers equal to a layer identifier specified in a SEI NAL unit that encapsulates the non-nested SEI message, and wherein a temporal identifier specified in the SEI NAL unit is required to be equal to a temporal identifier of an access unit containing the SEI NAL unit; and
process, based in part on data in the non-nested SEI message, video data of the layer of the bitstream to which the non-nested SEI message is applicable.

9. The video processing device of claim 8, wherein:
the SEI NAL unit includes a NAL unit header and a payload, the NAL unit header of the SEI NAL unit includes at least a first syntax element and a second syntax element, the first syntax element specifies the layer identifier specified in the SEI NAL unit, the second syntax element specifies the temporal identifier specified in the SEI NAL unit, and the payload of the SEI NAL unit includes the non-nested SEI message.

10. The video processing device of claim 8, wherein the non-nested SEI message is one of:

a pan-scan rectangle SEI message that includes data associated with displaying at a different picture aspect ratio than a picture aspect ratio of output pictures, a filler payload SEI message that includes data for adjusting a bit rate to meet specific constraints, a recovery point SEI message that includes information for clean random access or gradual decoding refresh, a scene information SEI message that includes information associated with scene changes and transitions, a picture snapshot SEI message that includes an indication to label an associated decoded picture as a still-image snapshot of video content, a progressive refinement segment start SEI message that includes information associated with a start of a segment of consecutive pictures that represent a progressive refinement of quality of a picture rather than a moving scene, a progressive refinement segment end SEI message that includes information associated with an end of the segment of consecutive pictures, a film grain characteristics SEI message that includes information associated with synthesizing film grain effects, a post filter hint SEI message that includes information associated with suggested post-filter coefficients or correlation information for post-filter design, a tone mapping information SEI message that includes information associated with remapping to another color space than that used or assumed in encoding, a frame packing arrangement SEI message that includes information associated with packing of stereoscopic video into the bitstream, a display orientation SEI message that includes information that specifies flipping and/or rotation to be applied to the output pictures when the output pictures are displayed, a structure of pictures information SEI message that includes information that describes temporal and inter prediction structure of the bitstream, a temporal sub-layer zero index SEI message that includes information associated with detecting when coded pictures with temporal identifiers equal to 0 are missing, or a region refresh information SEI message that includes information that indicates whether slice segments to which the non-nested SEI message applies belong to a refreshed region of a current picture.

11. The video processing device of claim 10, wherein:

the one or more processors are configured to determine, based on one or more syntax elements of the non-nested SEI message, a payload type variable for the non-nested SEI message, wherein the payload type variable for the non-nested SEI message indicates a payload type of the non-nested SEI message, and the payload type variable for the non-nested SEI message is equal to 2, 3, 6, 9, 15, 16, 17, 19, 22, 23, 45, 47, 128, 131, or 134.

12. The video processing device of claim 8, wherein:

the non-nested SEI message is a first non-nested SEI message, and the one or more processors are further configured to:

obtain, from the bitstream, a second non-nested buffering period SEI message that indicates initial delays for Hypothetical Reference Decoder (HRD) operations;

when the second non-nested buffering period SEI message is applicable to TargetOp, select, as an BIRD initialization point, an access unit associated with the second non-nested buffering period SEI message, wherein TargetOp is the set of layer identifiers in a bitstream-to-decode, the bitstream-to-decode being the bitstream or a sub-stream of the bitstream; and initialize a HRD at the selected access unit.

13. The video processing device of claim 8, wherein:

the non-nested SEI message is a first non-nested SEI message, and the one or more processors are further configured to:

obtain, from the bitstream, a second non-nested SEI message, the second non-nested SEI message being a buffering period SEI message that indicates initial delays for HRD operations, a picture timing SEI message that indicates picture output times and picture/sub-picture removal times for HRD operations, or a decoding unit SEI message that indicates sub-picture removal times for HRD operations, and for each respective access unit in a bitstream-to-decode:

select the second non-nested SEI message for the respective access unit when the second non-nested SEI message is associated with the access unit and the second non-nested SEI message is applicable to the set of layer identifiers in the bitstream-to-decode, wherein the bitstream-to-decode is the bitstream or a sub-bitstream of the bitstream; and use one or more syntax elements of the second non-nested SEI message in an HRD operation with regard to the respective access unit.

14. The video processing device of claim 8, wherein:

the non-nested SEI message is a first non-nested SEI message, and the one or more processors are further configured to:

obtain, from the bitstream, a second non-nested SEI message, the second non-nested SEI message being a buffering period SEI message that indicates initial delays for HRD operations, a picture timing SEI message that indicates picture output times and picture/sub-picture removal times for HRD operations, or a decoding unit SEI message that indicates sub-picture removal times for HRD operations;

determine an operation point applicable to the second non-nested SEI message, wherein a highest temporal identifier specified in all NAL units of the operation point applicable to the second non-nested SEI message is equal to a temporal identifier specified in a SEI NAL unit that encapsulates the second non-nested SEI message, and wherein a set of layer identifiers of all the NAL units of the operation point applicable to the second non-nested SEI message contains all integer values in the range of 0 to the layer identifier specified in the SEI NAL unit that encapsulates the second non-nested SEI message; and perform, based in part on values of one or more syntax elements of the second non-nested SEI message, an HRD operation with regard to the operation point applicable to the second non-nested SEI message.

15. The video processing device of claim 8, wherein the one or more processors are configured to decode, based in part on the one or more syntax elements in the non-nested SEI message, the video data of the layer of the bitstream to which the non-nested SEI message is applicable.

16. A video processing device comprising:
means for obtaining, from a bitstream of coded video data that includes a sequence of network abstraction layer (NAL) units, a non-nested Supplemental Enhancement Information (SEI) message, wherein the non-nested SEI message is not nested within a scalable nesting SEI message in the bitstream and the non-nested SEI message is not a buffering period SEI message, a picture timing SEI message, or a decoding unit information SEI message;
means for determining a layer of the bitstream to which the non-nested SEI message is applicable, wherein the layer to which the non-nested SEI message is applicable is a layer for which video coding layer (VCL) NAL units of the bitstream have layer identifiers equal to a layer identifier specified in a SEI NAL unit that encapsulates the non-nested SEI message, and wherein a temporal identifier specified in the SEI NAL unit is required to be equal to a temporal identifier of an access unit containing the SEI NAL unit; and
means for processing, based in part on data in the non-nested SEI message, video data of the layer of the bitstream to which the non-nested SEI message is applicable.

17. The video processing device of claim 16, wherein:
the SEI NAL unit includes a NAL unit header and a payload,
the NAL unit header of the SEI NAL unit includes at least a first syntax element and a second syntax element,
the first syntax element specifies the layer identifier specified in the SEI NAL unit,
the second syntax element specifies the temporal identifier specified in the SEI NAL unit, and
the payload of the SEI NAL unit includes the non-nested SEI message.

18. A computer-readable storage medium having instructions stored thereon that, when executed, configure a video processing device to:
obtain, from a bitstream of coded video data that includes a sequence of network abstraction layer (NAL) units, a non-nested Supplemental Enhancement Information (SEI) message, wherein the non-nested SEI message is not nested within a scalable nesting SEI message in the bitstream and the non-nested SEI message is not a buffering period SEI message, a picture timing SEI message, or a decoding unit information SEI message;
determine a layer of the bitstream to which the non-nested SEI message is applicable, wherein the layer to which the non-nested SEI message is applicable is a layer for which video coding layer (VCL) NAL units of the bitstream have layer identifiers equal to a layer identifier specified in a SEI NAL unit that encapsulates the non-nested SEI message, and wherein a temporal identifier specified in the SEI NAL unit is required to be equal to a temporal identifier of an access unit containing the SEI NAL unit; and
process, based in part on data in the non-nested SEI message, video data of the layer of the bitstream to which the non-nested SEI message is applicable.

19. The computer-readable storage medium of claim 18, wherein:
the SEI NAL unit includes a NAL unit header and a payload,
the NAL unit header of the SEI NAL unit includes at least a first syntax element and a second syntax element,
the first syntax element specifies the layer identifier specified in the SEI NAL unit,
the second syntax element specifies the temporal identifier specified in the SEI NAL unit, and
the payload of the SEI NAL unit includes the non-nested SEI message.

* * * * *